(12) United States Patent
Hatch

(10) Patent No.: US 10,926,821 B2
(45) Date of Patent: Feb. 23, 2021

(54) METHODS FOR TRAINING A PERSON TO RIDE A BICYCLE USING ANGULAR MOMENTUM

(71) Applicant: Richard J. Hatch, Pittsburgh, PA (US)

(72) Inventor: Richard J. Hatch, Pittsburgh, PA (US)

( * ) Notice: Subject to any disclaimer, the term of this patent is extended or adjusted under 35 U.S.C. 154(b) by 324 days.

(21) Appl. No.: 15/997,980

(22) Filed: Jun. 5, 2018

(65) Prior Publication Data

US 2019/0367113 A1 Dec. 5, 2019

(51) Int. Cl.
*B62H 7/00* (2006.01)
*B62H 1/10* (2006.01)
*E04F 11/00* (2006.01)

(52) U.S. Cl.
CPC .............. *B62H 7/00* (2013.01); *B62H 1/10* (2013.01); *E04F 11/002* (2013.01)

(58) Field of Classification Search
CPC .............. B62H 7/00; B62H 1/10; A63B 69/19
See application file for complete search history.

(56) References Cited

U.S. PATENT DOCUMENTS

| | | | |
|---|---|---|---|
| 3,554,329 A * | 1/1971 | Shimano | B62L 3/02 188/24.18 |
| 5,338,204 A | 8/1994 | Herndon | |
| 5,887,883 A | 3/1999 | Joules | |
| 7,798,513 B1 * | 9/2010 | Salvant | B62H 7/00 280/304.3 |
| 2007/0065784 A1 * | 3/2007 | Nix | G09B 9/058 434/61 |
| 2010/0193287 A1 * | 8/2010 | Storm | A63B 69/0064 182/3 |

OTHER PUBLICATIONS

5 Key Tips for Learning How to Ride a Bike published on www.nobiggie.com on May 7, 2012. (Year: 2012).*
Why is it so hard to balance on a bicycle that's not moving, and easy on one that is? (Matt Soniak; Sep. 20, 2010) www.mentalfloss.com.

* cited by examiner

*Primary Examiner* — James S. McClellan
(74) *Attorney, Agent, or Firm* — Carissa T. Howard

(57) ABSTRACT

Methods of teaching and learning bicycle riding skills are disclosed, including training a student to ride a bicycle comprising positioning a student on a bicycle at the top of an inclined surface with a slope in a range of 8 to 15 degrees and a distance of at least 30 feet, wherein the student straddles the bicycle's seat such that the student's feet engage the inclined surface and the student's hands engage the bicycle's hand brakes. The student releases the brakes and lifts his/her feet from the inclined surface. Under angular momentum, the bicycle moves down the inclined surface while the student steers the bicycle. The bicycle is returned to the top of the inclined surface and the steps are repeated. The student also learns to pedal the bicycle using the inclined surface with similar repeatable steps. Other skills such as starting the bicycle with the pedals are taught.

18 Claims, 3 Drawing Sheets

METHODS FOR TRAINING A PERSON TO RIDE A BICYCLE USING ANGULAR MOMENTUM

BACKGROUND OF THE INVENTION

Learning how to ride a two-wheel bicycle requires both coordination and balancing skills. Riders may also have to overcome apprehension and fear of falling. Both children and adults who are beginner cyclists could benefit from a safe and effective method of learning how to ride a bicycle.

Many riders learn how to ride a bicycle with training wheels that attach to the rear wheel. This method is effective in teaching basic steering skills and the rider becomes accustomed to the drive train operation of the bicycle needed to propel the bicycle. However, the learner tends to lean on the training wheels for support much like riding a tricycle, creating a dependency for the training wheels, whereby preventing the learner from developing the necessary balancing skills.

Other methods of teaching bicycle riding include an instructor that stabilizes the bicycle for the rider while the bike is in motion. These methods include the use of a device that attaches to the bicycle to help the instructor keep the bicycle in an upright position, such as the one described in U.S. Pat. No. 5,338,204. Simpler methods require the instructor to simply hold onto a part of the bicycle or the rider. In these methods, the instructor follows the rider on the bicycle to provide support and to prevent the rider from falling. However, this direct instructor contact with the rider or the bicycle physically interferes with the rider's control and movement of the bicycle and can impart instability and imbalance. Additionally, running along side of a moving bicycle is physically demanding on the instructor.

Other methods of teaching bicycle riding include teaching some skills while the bicycle is not moving such as the method described in U.S. Pat. No. 5,887,883. This method however, teaches only one isolated skill and does not teach how to balance a moving bicycle.

Other methods of teaching bicycle riding include the use of balance bicycles which do not have any pedals or that have removal pedals such as the one described in U.S. Pat. No. 7,798,513. Investing in a dedicated training balance bicycle may be expensive or impractical for the average beginner. It is desirable to have students learn on a bicycle that is relatively the same size and weight as the bicycle that they will ultimately ride post-lessons. It is also desirable to have a method of teaching bicycle riding that can be used with many types of bicycles.

The methods of the present invention provide for instruction on how to independently ride a two-wheel bicycle. The methods include teaching all necessary bicycle riding skills, beginning with independently balancing the bicycle while the bicycle is in motion, and also including pedaling the bicycle while balancing the bicycle in a vertically upright position, and starting the bicycle into motion with the pedals so that the rider obtains a vertically upright moving position. The skills can be learned in a relatively short amount of time, on any suitable bicycle, for any capable student, without a huge physical burden on the instructor, with predictable results.

SUMMARY OF THE INVENTION

Training a student to ride a bicycle includes teaching the student how to balance the bicycle down an inclined surface and how to balance and pedal the bicycle down an inclined surface. First, a student is positioned on a first bicycle at the top of an inclined surface with a slope in a range of 8 to 15 degrees and a distance of at least 30 feet, wherein the student straddles the bicycle's seat such that the student's feet engage the inclined surface and the student's hands engage the bicycle's hand brakes. Next, the student releases the brakes and lifts his/her feet from the inclined surface. Next, the bicycle moves down the inclined surface while the student steers the bicycle. The bicycle is returned to the top of the inclined surface and the steps are repeated.

The student is also taught how to pedal the moving bicycle down the inclined surface. First, the student is positioned on a bicycle with pedals at the top of the inclined surface with a slope in a range of 8 to 15 degrees and a distance of at least 30 feet, wherein the student straddles the seat and the student's feet are placed on the pedals of the second bicycle. The student is stabilized at the top of the inclined surface in this upright position with the student's feet on the pedals. Next, the bicycle is released. The student pedals down the inclined surface while steering the bicycle. The bicycle is returned to the top of the inclined surface and the steps are repeated.

Also described are methods of learning to ride a bicycle.

Also described are method of teaching bicycle riding that includes steps of having the student starting the bicycle with the pedals without the need of the instructor having to stabilize and release the bicycle.

DETAILED DESCRIPTION OF THE INVENTION

Figure 1:
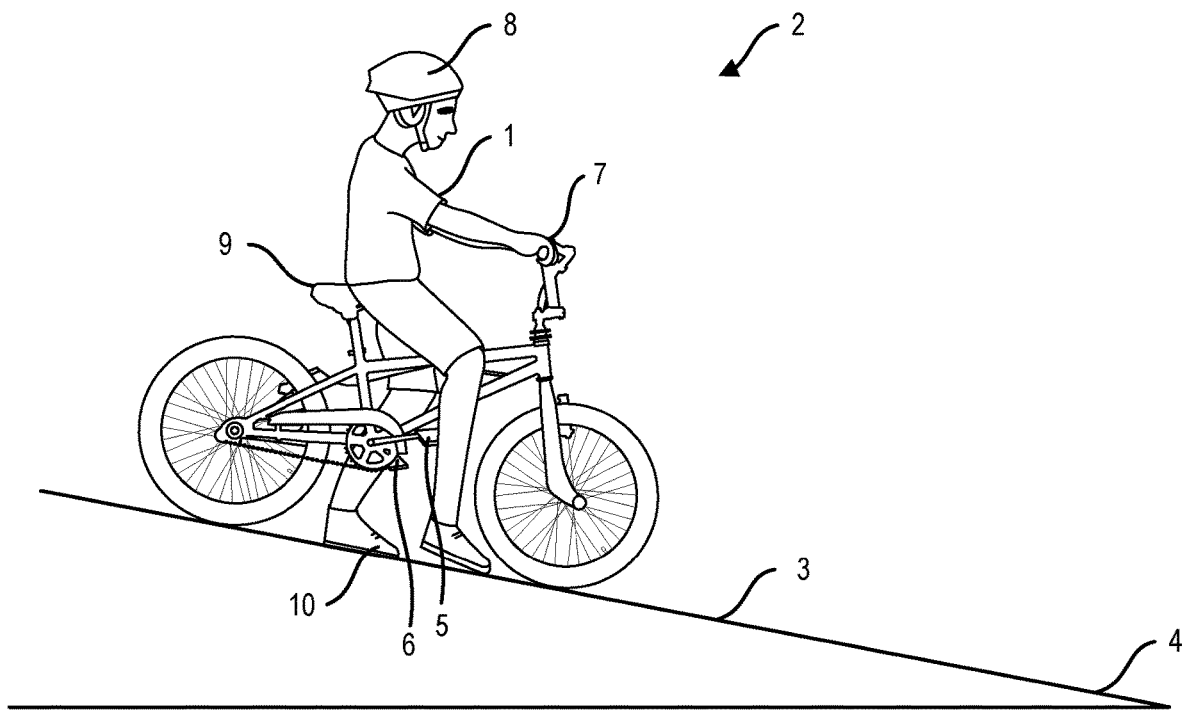
FIG. 1 shows the positioning of a student on a bicycle at the top of an inclined surface with the student's feet on the ground.

FIG. 1 shows how to position a student 1 on a two-wheeled bicycle 2 at the top of an inclined surface 3. The inclined surface 3 has a slope 4 of about 8 degrees to about 15 degrees. The student 1 sits on bicycle 2, which may or may not have pedals 5 and 6. The bicycle 2 has handlebars 7 with handbrakes and seat 9. The student 1 may wear a helmet 8.

The present methods of training a person to ride a bicycle make use of angular momentum and gyroscopic precession. Specifically, positioning a student 1 at the top of an inclined surface 3 allows the student 1 to use the angular momentum generated by the bicycle 2 traveling down the inclined surface. The slope of the inclined surface 3 is designed so that a student 2 can generate enough speed on the bicycle 2 so that the student can learn the feeling of balancing the bicycle without the need to have to generate that speed herself. Additionally, the length of the inclined surface is designed so that this step of traveling down the inclined surface may be repeatable. A length of about 30 feet to about 60 feet is preferable before the surface flattens out. This distance of the inclined surface 3 ensures that the student can practice this skill repeatedly until mastered. This balancing skill can be learned in the majority of students (about 90%) in about a 40-minute first session.

The concept that a moving two-wheeled bicycle is easier to balance than a stationary one is the principal of gyroscopic precession (rotation). A bicycle wheel acts like a giant gyroscope. A spinning bicycle wheel resists efforts to tilt it and point the axle in a new direction. Any rapidly spinning wheel exhibits this gyroscopic property and this tendency acts to keep a student upright while riding a bicycle down an inclined surface.

Speeds of about 3 mph to about 15 mph can be obtained using an inclined surface having slope of about 8 to about 15 degrees over the distance of about 30 feet to about 60 feet. In one embodiment, the speed is about 3 to 5 mph and the slope is about 8 to 12 degrees. These speeds, angles, and distances have been designed to provide the student with enough time to feel the balancing of the bicycle while coasting down the inclined surface while taking into account the student's apprehension of falling and the ease of repeating the step until mastered.

In one embodiment of the invention, a three-tiered bicycle teaching technique may be taught to any student. The three-tiered systematic task-oriented teaching technique for beginning bicycle students allows students to acquire the skills to become proficient and safe trail and road riding bicyclists.

The first tier of the three-tiered bicycle teaching technique involves balancing the moving bicycle. First, a student is positioned on a bicycle at the top of an inclined surface as shown in FIG. 1 so that he can straddle the seat with both hands on the handle bars engaging the bicycle's hand brakes. The student sits on the bicycle seat with her feet on the ground. The bicycle may be any suitable bicycle that fits the size of the student. It is appropriate to use a bicycle that is similar in size and weight to one that the student is ultimately going to be using on their own, once they have learned to ride. This bicycle may or may not have pedals. This bicycle may or may not be a dedicated training bicycle or a balance bicycle. This bicycle may be one provided by the instructor or one provided by the student. If this bicycle has pedals, the student should be instructed to avoid and ignore the pedals for this step. The bicycle can be one with the pedals removed, ignored, covered up, immobilized, or any other suitable means of simply allowing the bicycle to coast down the hill without pedaling. The instructor may place the pedals in a certain start position so that the pedals are out of the way as much as possible as the student coasts down the slope.

The seat 9 of the bicycle should be adjusted such that the student's feet 10 can touch the ground. This positioning may result in the seat of the bicycle being lower than commonly recommended practice for this step of the teaching. At this point in the training, since it is the beginning of the lessons, the student may be apprehensive about bike riding. Therefore, having their feet on the ground gives them a sense of security even if they are positioned at the top of an inclined surface.

Next, on command of the instructor, the student disengages or releases the hand brakes, lifts their feet and allows the angular momentum created by the slope get the bike up to speed. Using the handlebars, the student directs the bicycle in a straight line down the inclined surface. This motion creates the gyroscopic precession (rotation) necessary to balance the bike. The faster the bike rolls down the slope, the more the gyroscopic precession effect becomes apparent and the bike wheels align with the student achieving equilibrium.

Once the student reaches the end of the inclined surface and reaches the flat surface at the bottom, the student may stop the bicycle. Once on the relatively flat surface after the inclined surface, the student may practice turning the bicycle and stopping the bicycle in this area. The student may use his hand brakes to stop the bicycle and/or his feet.

The student may be instructed to use their feet to break any fall that they feel coming. The student may drag his/her feet along the inclined surface the first few times down the inclined surface as they become used to controlling the bicycle. The student is encouraged to pick up his/her feet off the ground. The student may bend his/her knees so that the feet come off the ground. The student may be instructed to keep the handlebars of the bicycle steady and straight.

The student and bicycle then return to the top of the hill to coast down again. This process is repeated until the student has mastered this balance skill. The lesson may be about 20 minutes to about 40 minutes. Preferably, the student can ride down the inclined surface without pedaling and without falling or breaking a fall before moving on to the next step. Preferably, the student can ride down the inclined surface without pedaling and without falling or breaking a fall several times in a row before moving on to the next step. The student has mastered balancing a moving bicycle independently while keeping the bicycle in a vertically upright position for the length of the inclined slope.

Once the balance skill is achieved, the student may take a break before the next lesson. Once the balance skill is achieved, the student resumes lessons. The student is then taught the next skill—how to balance and pedal a moving bicycle. The student is placed on a bike on the same slope except that the feet are placed on the pedals with the instructor holding the student vertically upright on the bike.

Figure 2:
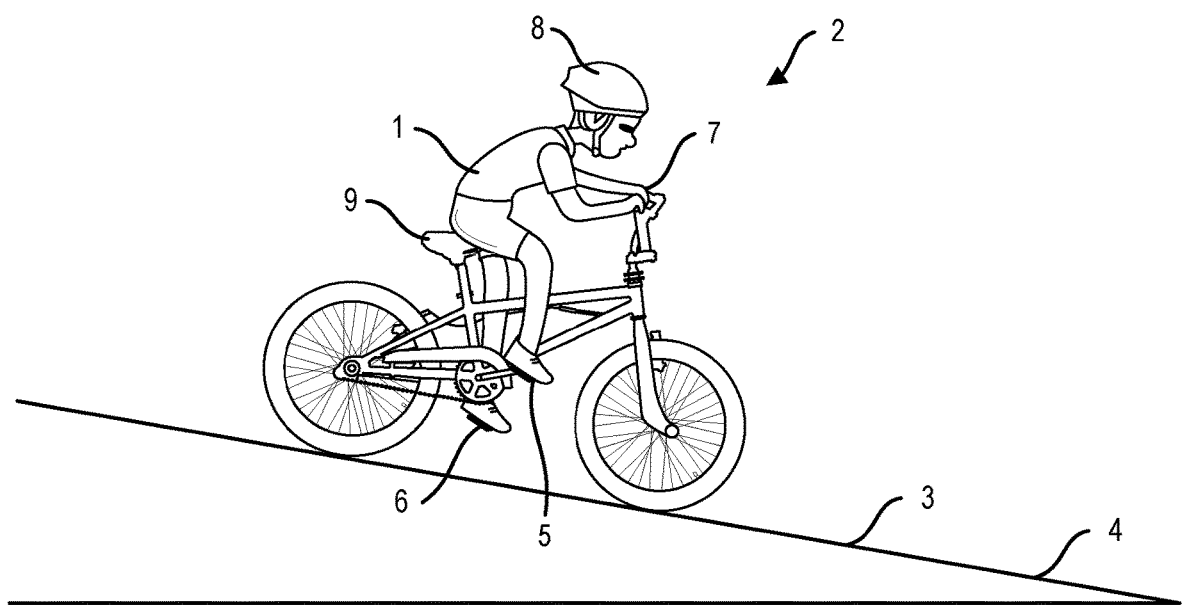
FIG. 2 shows the positioning of a student on a bicycle at the top of an inclined surface with the student's feet on the bicycle's pedals.

FIG. 2 shows how to position a student 1 on a two-wheeled bicycle 2 at the top of an inclined surface 3. The inclined surface 3 has a slope 4 of about 8 degrees to about 15 degrees. The student 1 sits on bicycle 2, which has pedals 5 and 6. The student's feet 10 are placed on the pedals 5 and 6. The bicycle 2 has handlebars 7 with handbrakes and seat 9. The student 1 wears a helmet 8.

At this point, the bicycle needs to have operational pedals and the student will be instructed to pedal the bicycle. It can be the same bicycle as used before. It can be the same bicycle as used in the previous step with the pedals attached. It may be a different bicycle in this step than the last. The relative size and weight of the bicycle used in the previous balancing step should be about the same as the size and weight of the bicycle used in this pedaling step. The methods of the invention may be used with many different bicycles.

The bicycle seat may be raised at this step so that the student can more readily access the pedals. The instructor may hold the seat or the handlebars of the bicycle in place or he may hold the student in place by the shoulder(s). Once the student is positioned correctly with their feet on the pedals at the top of the inclined surface and stabilized by the instructor, the instructor releases the student and the student pedals down the slope. The instructor may place the pedals in a certain start position depending on whether the student is right- or left-handed. The rider should use the same starting position on the pedals each time so that the steps are familiar and repeatable for the student. The process is repeated until the student masters the balance skill and simultaneous pedaling. The student should practice this step for about 20 minutes.

The speeds obtained in this pedaling step will be faster than the speeds obtained in the coasting step. This is because in addition to the angular momentum created by the inclined surface, the rider is also generating speed with the pedals adding to the propulsion of the bicycle.

The steps of balancing the bicycle while coasting down the inclined surface and pedaling while balancing the bicycle down the inclined surface are the skills taught in the first-tier of the three-tiered system.

Once the skill of pedaling while balancing the bicycle in the vertically upright position is mastered, the rider will learn some more mechanics of bicycle riding. Mastering these mechanics is the second tier in the three-tier system. The second-tier mechanics include starting the bicycle on the inclined surface, starting the bicycle on a flat surface, left turns, and right turns.

To teach the student to start the bicycle herself, use the inclined surface. Have the student straddle the bicycle as before. The instructor will place the pedals into the familiar position, however, the instructor will not stabilize the rider with her feet on the pedals at the top of the inclined surface. Instead, the rider will hold her own bicycle by the handle bars slightly tilted so that one foot is on the ground and the second foot is on one of the pedals. The rider will practice bringing the bicycle into a vertically upright position and getting her second foot on the pedals as she pedals the bicycle down the hill. As with previous steps, this step is repeated until mastered.

Next, the student will move to a flat surface. The student will learn to start the bicycle on this flat surface and pedal for an appropriate distance. The student will next practice riding the bicycle in an oval or circle in both the clock-wise and counter clock-wise directions. The student will practice left turns. The student will practice right turns.

Other mechanics to teach the student include stopping the bicycle with the brakes, walking the bicycle, and using the kickstand.

The student will be with an instructor in a flat area big enough for the student to practice the above tasks. The instructor may position safety cones at either end of the area to manage turns. The student will repeat and practice until each task is mastered.

Finally, the student is taught the skills included in the third tier in the three-tier system. The student may be taught trail riding and bicycle safety for the road. For both trail and road riding, the student may be taught how to use hand signals prior to turning, stopping, passing, slowing down. The student may be taught the difference between the gears of the bicycle and how to change gears depending on the incline of the riding surface.

The instructor may ride on his or her own bicycle along side of the student on his or her bicycle. Riding together, the student may practice gear shifting. Also, trail riding etiquette and situational decision making may be taught with the instructor following the student on a bike on a bike trail.

The training time needed to master the skills outline above may vary from student to student. However, about 90% of students will master the tasks required to ride a bicycle within three to five 40-minute training sessions. The session time limits and frequency may be increased or reduced depending on how quickly the individual student becomes fatigued and achieves the learning curve.

Students may learn either inside or outside. If students are learning outside, the inclined surface may be real or artificial grass, mowed grass, or may be asphalt or a suitable path or trail. If students are learning inside, the inclined surface may be any suitable material, including materials used for skateboard ramps, materials used in parkour or gymnastics studios, material used for indoor running or bicycle tracks, carpet, foam, padding, or any other suitable synthetic material. The inclined surface may have padded barriers on either side designed to keep the student on a straight path down the inclined surface.

Students may learn appropriate bicycle safety. For example, each student may wear a well-fitted helmet and a reflective vest. Long pants, long sleeves, gloves, knee and elbow pads are optional. Students should have water available for hydration and frequent breaks are needed in warmer weather.

Figure 3:
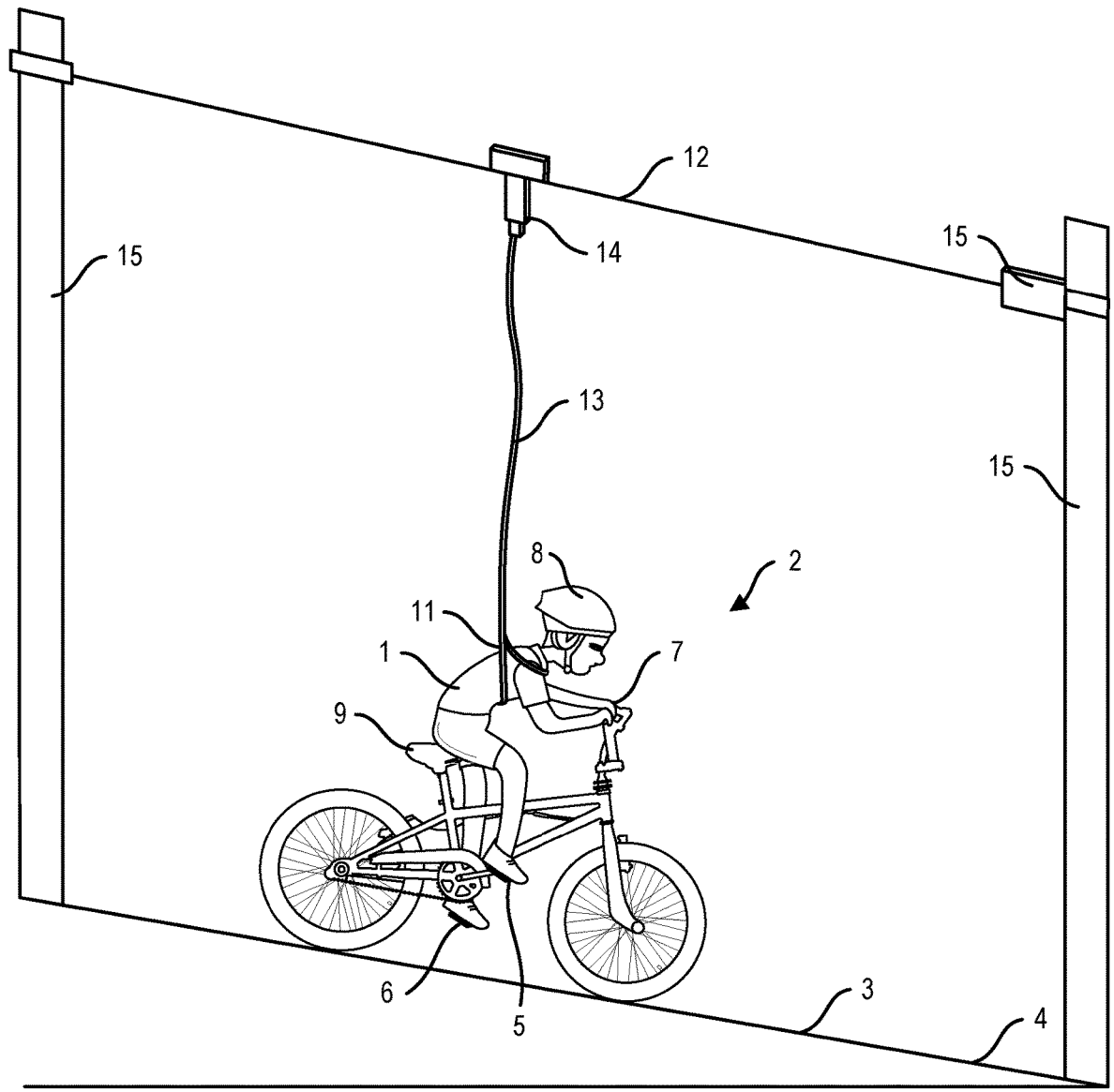
FIG. 3 shows a student on a bicycle on an inclined surface wherein the student is attached to an overhead zipline with a harnessing system.

In one embodiment of the present invention, an overhead zip line may be attached to a student-worn harness as seen in FIG. 3. Having students tethered as they transverse the inclined surface may be useful in preventing the student from falling during the balance training. It also helps the student feel more secure and less apprehensive. This embodiment may be applied inside or outside.

The student 1 may wear a vest or harness 11 that connects to an overhead line 12. The harness lead 13 attaches to the overhead line 12 with the use of a pulley 14. The overhead line 12 runs parallel to the inclined surface a few feet above the student 1. At the end of the overhead line, there is a suitable stopper 15. The overhead line may be secured on either end of the inclined surface by poles 15 or any suitable means. There may be 2 poles at the bottom of the inclined surface so that the student can ride in between them. The poles 15 may be padded for safety. This harness system makes use of zipline technology that is known in the art.

The methods described herein can be used to teach any beginner to ride bicycle, regardless of age or experience. Students as young as about 5 or 6-years old can be taught these skills.

Selecting a bicycle that is suitable for a person's size, strength, and ability level is a skill known in the art. As described here, many types and styles of bicycles can be used to teach the methods employing angular momentum.

The drawings are for illustration purposes only. The invention is not limited to the exemplary dimensions depicted in the drawings. Other dimensions and embodiments are herein included in the present invention.

What is claimed is:

1. A method of training a person to ride a bicycle comprising the steps of:
 a) positioning a student on a first bicycle at the top of an inclined surface with a slope in a range of 8 to 15 degrees and a distance of at least 30 feet, wherein the first bicycle is selected to fit the student in size and weight, and wherein the student straddles the bicycle's seat such that the student's feet engage the inclined surface, wherein the bicycle's seat is placed at a first height so that the student can firmly plant his/her feet on the inclined surface while seated, and wherein the student's hands engage the bicycle's hand brakes, and wherein the first bicycle may or may not have pedals;
 b) having the student disengage the brakes and having the student lift his/her feet from the inclined surface, wherein if the first bicycle has pedals, the student is instructed to ignore the pedals when lifting his/her feet;
 c) allowing the bicycle to move down the inclined surface while the student steers the bicycle as it moves down the inclined surface, wherein the feet remain lifted;
 d) stopping the bicycle with the feet and/or hand brakes; returning the bicycle to the top of the inclined surface;
 e) repeating steps (a)-(d) for a period of time of about 20 minutes to about 40 minutes;
 f) positioning the student on a second bicycle, wherein the second bicycle has hand brakes and is selected to fit the student in size and weight and wherein the second bicycle has pedals, at the top of the inclined surface with a slope in a range of 8 to 15 degrees and a distance of at least 30 feet, wherein the student straddles the seat and the student's feet are placed on the pedals of the second bicycle, wherein the bicycle's seat is positioned to a second height that is higher than the first height of step (a);
g) stabilizing the student on the bicycle at the top of the inclined surface in an upright position with the student's feet on the pedals;
h) releasing the bicycle;
i) having the student pedal down the inclined surface while steering the bicycle, instructing the student to use the hand brakes to stop;
j) returning the bicycle to the top of the inclined surface; and
k) repeating steps (f)-(j) for a period of time of 20 minutes to about 40 minutes.

2. The method of claim 1, wherein the first and second bicycles are the same bicycle, without and with the pedals attached, respectively.

3. The method of claim 1, wherein the first bicycle is a training bicycle without pedals.

4. The method of claim 1, wherein the slope of the inclined surface is about 8 degrees.

5. The method of claim 1, wherein the student wears a harness that is attached to an overhead zipline that runs parallel to the inclined surface.

6. The method of claim 1, wherein steps (a)-(d) are repeated until the student can consistently balance the moving bicycle down the distance of the inclined surface with his/her feet off the inclined surface.

7. The method of claim 1, further comprising, after step (k), the step of having the student start pedaling themselves down the inclined surface without the need for stabilizing and releasing the student's bicycle.

8. The method of claim 7, further comprising, the step of having the student pedal the bicycle on a flat surface without the need for stabilizing and releasing the student's bicycle.

9. The method of claim 1, wherein in step (c) the bicycle is moving at a speed about 3 mph.

10. A method of learning to ride a bicycle comprising the steps of:
a) positioning a first bicycle at the top of an inclined surface with a slope in a range of 8 to 15 degrees and a distance of at least 30 feet, wherein the first bicycle is selected to fit the student in size and weight, and wherein the student straddles the bicycle's seat such that the student's feet engage the inclined surface, wherein the bicycle's seat is placed at a first height so that the student can firmly plant his/her feet on the inclined surface while seated, and wherein the student's hands engage the bicycle's hand brakes, and wherein the first bicycle may or may not have pedals;
b) disengaging the brakes and lifting the student's feet from the inclined surface, wherein if the first bicycle has pedals, the student ignores the pedals when lifting his/her feet;
c) allowing the bicycle to move down the inclined surface while the student steers the bicycle as it moves down the inclined surface, wherein the feet remain lifted;
d) stopping the bicycle with the feet and/or hand brakes; returning the bicycle to the top of the inclined surface;
e) repeating steps (a)-(d) for a period of time of about 20 minutes to about 40 minutes;
f) positioning a second bicycle, wherein the second bicycle has hand brakes and is selected to fit the student in size and weight and wherein the second bicycle has pedals at the top of the inclined surface with a slope in a range of 8 to 15 degrees and a distance of at least 30 feet, wherein the student straddles the seat and the student's feet are placed on the pedals of the second bicycle, wherein the bicycle's seat is positioned to a second height that is higher than the first height of step (a);
g) stabilizing the student on the bicycle at the top of the inclined surface in an upright position with the student's feet on the pedals;
h) releasing the bicycle;
i) having the student pedal down the inclined surface while steering the bicycle, using the hand brakes to stop;
j) returning the bicycle to the top of the inclined surface; and
k) repeating steps (f)-(j) for a period of time of about 20 minutes to about 40 minutes.

11. The method of claim 10, wherein the student wears a harness that is attached to an overhead zipline that runs parallel to the inclined surface.

12. The method of claim 10, wherein the first and second bicycles are the same bicycle, without and with the pedals attached, respectively.

13. A method of training a person to ride a bike, comprising the steps of:
a) teaching a person to balance a moving bicycle, which comprises the steps of:
   i) positioning a student on a first bicycle at the top of an inclined surface with a slope in a range of 8 to 15 degrees and a distance of at least 30 feet, wherein the first bicycle is selected to fit the student in size and weight, and wherein the student straddles the bicycle's seat such that the student's feet engage the inclined surface, wherein the bicycle's seat is placed at a first height so that the student can firmly plant his/her feet on the Inclined surface while seated, and wherein the student's hands engage the bicycle's hand brakes, and wherein the first bicycle may or may not have pedals;
   ii) having the person disengage the brakes and having the student lift his/her feet from the inclined surface, wherein if the first bicycle has pedals, the student is instructed to ignore the pedals when lifting his/her feet;
   iii) allowing the bicycle to move down the inclined surface while the person steers the bicycle as it moves down the inclined surface, wherein the feet remain lifted;
   iv) stopping the bicycle with the feet and/or hand brakes; returning the bicycle to the top of the inclined surface; and
   v) repeating steps (i)-(iv) for a period of time of about 20 minutes to about 40 minutes;
b) teaching the person to pedal a moving bicycle, which comprises the steps of:
   i) positioning the student on a second bicycle, wherein the second bicycle has hand brakes and is selected to fit the student in size and weight and wherein the second bicycle has pedals, at the top of the inclined surface with a slope in a range of 8 to 15 degrees and a distance of at least 30 feet, wherein the student straddles the seat and the student's feet are placed on the pedals of the second bicycle, wherein the bicycle's seat is positioned to a second height that is higher than the first height;

ii) stabilizing the person on the bicycle at the top of the inclined surface in an upright position with the person's feet on the pedals;
iii) releasing the bicycle;
iv) having the person pedal down the inclined surface while steering the bicycle, instructing the student to use the hand brakes to stop;
v) returning the bicycle to the top of the inclined surface; and
vi) repeating steps (i)-(v) for a period of time of about 20 minutes to about 40 minutes;
c) teaching the person to start the bicycle without the stabilizing and releasing steps, using the pedals of the bicycle positioned at the top of the inclined surface;
d) teaching the person to start the bicycle without the stabilizing and releasing steps, using the pedals of the bicycle positioned on a flat surface; and
e) teaching the person to turn the moving bicycle to the left and to the right.

14. The method of claim 13, wherein the first and second bicycles are the same bicycle, without and with the pedals attached, respectively.

15. The method of claim 13, wherein the first bicycle is a training bicycle without pedals.

16. The method of claim 13, wherein the slope of the inclined surface is about 8 degrees.

17. The method of claim 13, wherein the student wears a harness that is attached to an overhead zipline that runs parallel to the inclined surface.

18. The method of claim 13, further comprising teaching the person how to use gears of the bicycle.

* * * * *